US012798349B2

(12) United States Patent
Barciela Díaz-Blanco et al.

(10) Patent No.: US 12,798,349 B2
(45) Date of Patent: Nov. 17, 2026

(54) APPARATUS FOR DRIVING A MOTOR VEHICLE, AND ASSOCIATED METHOD

(71) Applicant: MAN Truck & Bus SE, Munich (DE)

(72) Inventors: Bruno Barciela Díaz-Blanco, Munich (DE); Moritz Finke, Aachen (DE)

(73) Assignee: MAN Truck & Bus SE, Munich (DE)

( * ) Notice: Subject to any disclaimer, the term of this patent is extended or adjusted under 35 U.S.C. 154(b) by 574 days.

(21) Appl. No.: 18/271,314

(22) PCT Filed: Dec. 23, 2021

(86) PCT No.: PCT/EP2021/087504
§ 371 (c)(1),
(2) Date: Jul. 7, 2023

(87) PCT Pub. No.: WO2022/152545
PCT Pub. Date: Jul. 21, 2022

(65) Prior Publication Data

US 2024/0059135 A1 Feb. 22, 2024

(30) Foreign Application Priority Data

Jan. 13, 2021 (DE) ..................... 10 2021 100 489.6

(51) Int. Cl.
*B60K 1/04* (2019.01)
*B60L 58/27* (2019.01)
(Continued)

(52) U.S. Cl.
CPC ................ *B60K 1/04* (2013.01); *B60L 58/27* (2019.02); *H01M 10/615* (2015.04); *H01M 10/625* (2015.04); *B60K 2001/005* (2013.01)

(58) Field of Classification Search
CPC .................................. B60K 1/04; B60L 58/27
See application file for complete search history.

(56) References Cited

U.S. PATENT DOCUMENTS 12,214,644 B2 * 2/2025 Heyl ....................... F25B 9/008
2012/0258337 A1 * 10/2012 Wang ...................... B60L 58/18
429/50
(Continued)

FOREIGN PATENT DOCUMENTS

DE 102011012723 A1 8/2012
DE 102017219792 A1 5/2019
(Continued)

OTHER PUBLICATIONS

German Search Report issued in German Patent Application No. 102021100489.6 dated Nov. 12, 2021. English translation not available.

(Continued)

*Primary Examiner* — Brian L Swenson
(74) *Attorney, Agent, or Firm* — Weber Rosselli & Cannon LLP

(57) ABSTRACT

The invention relates, inter alia, to an apparatus (10) for driving a motor vehicle, comprising a heat transfer device (18) by means of which a second electrical energy store (16) and/or an electrical drive unit (12) can be or is coupled to a first electrical energy store (14) in order to transfer heat, preferably in order to heat the first electrical energy store (14) by means of waste heat from the second electrical energy store (16) and/or the electrical drive unit (12). Due to the hybrid construction of the two electrical energy stores (14, 16), energetic synergies can be utilised with the aid of a suitable thermal management system, in order to achieve savings in terms of energy supply and thus ultimately increase the range of the motor vehicle.

19 Claims, 1 Drawing Sheet

Figure 1:
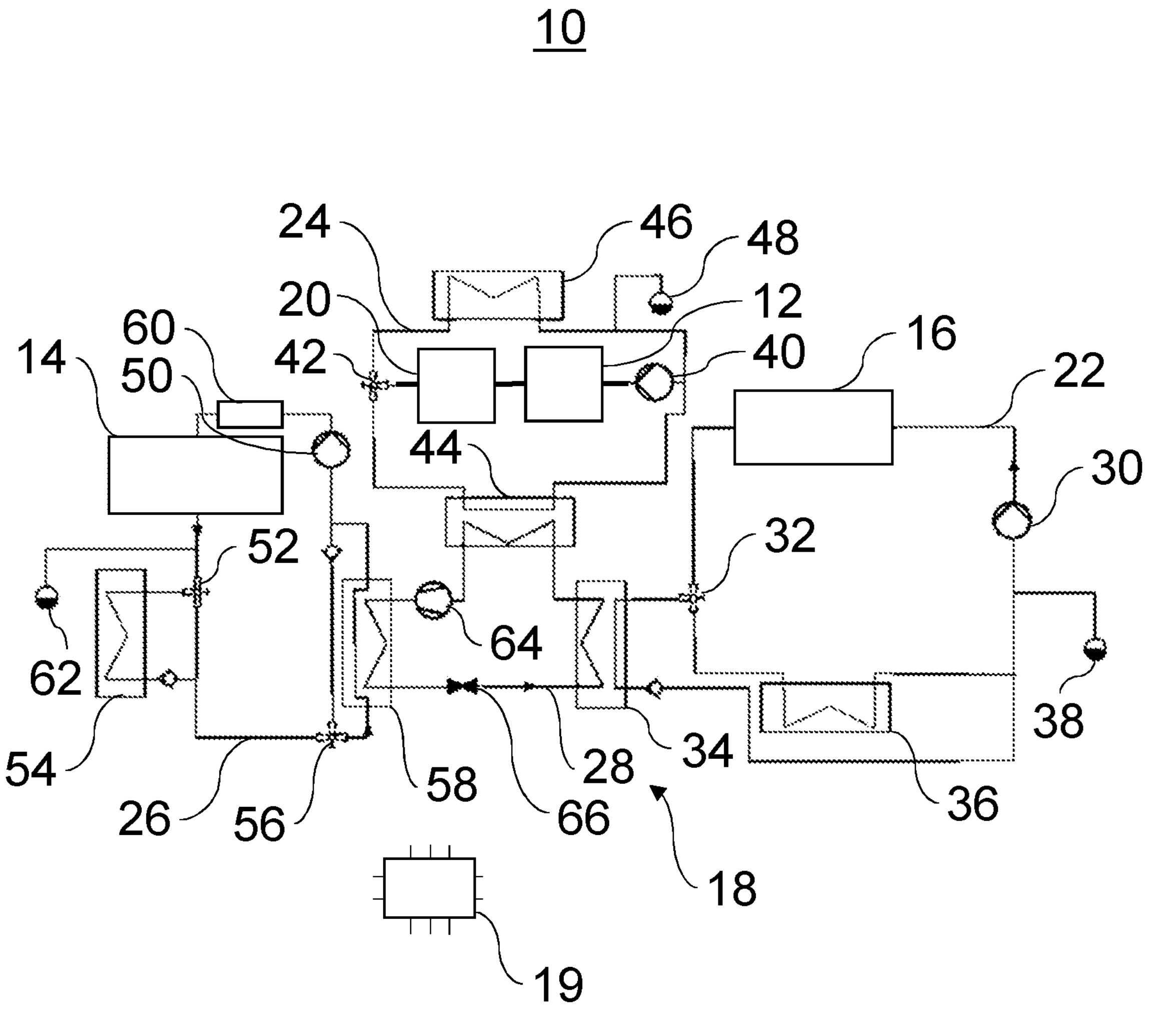

(51) Int. Cl.

| | |
|---|---|
| ***H01M 10/615*** | (2014.01) |
| ***H01M 10/625*** | (2014.01) |
| *B60K 1/00* | (2006.01) |

(56) References Cited

U.S. PATENT DOCUMENTS

| | | | | |
|---|---|---|---|---|
| 2014/0041826 | A1* | 2/2014 | Takeuchi | B60L 1/08 165/10 |
| 2017/0110770 | A1* | 4/2017 | Marcicki | H01M 10/625 |
| 2018/0257481 | A1 | 9/2018 | Zhou et al. | |
| 2019/0356012 | A1 | 11/2019 | Hermann | |
| 2019/0363411 | A1* | 11/2019 | Takeuchi | H01M 10/6552 |
| 2021/0126304 | A1* | 4/2021 | Shao | H01M 10/627 |
| 2022/0134905 | A1* | 5/2022 | Cox | B60L 3/0046 429/71 |
| 2022/0324288 | A1* | 10/2022 | Cohan | B60L 58/26 |
| 2024/0351396 | A1* | 10/2024 | Hofmanninger | B60H 1/00278 |
| 2024/0405315 | A1* | 12/2024 | Hou | H01M 50/209 |

FOREIGN PATENT DOCUMENTS

| | | | |
|---|---|---|---|
| DE | 102018219824 | A1 | 5/2020 |
| DE | 102019129555 | A1 | 11/2020 |
| EP | 2908378 | A1 | 8/2015 |

OTHER PUBLICATIONS

International Search Report issued in PCT Application No. PCT/EP2021/087504 dated May 13, 2022.

* cited by examiner

APPARATUS FOR DRIVING A MOTOR VEHICLE, AND ASSOCIATED METHOD

CROSS-REFERENCE TO RELATED APPLICATIONS

This application is a 371 application of PCT/EP2021/087504 filed Dec. 23, 2021 which claims benefit of and priority to German Patent Application Serial No. DE102021100489.6 filed Jan. 13, 2021, the disclosures of the above-identified applications are hereby incorporated by reference in their entirety.

The invention relates to a device for driving a motor vehicle and a method for operating a device for driving a motor vehicle.

Electric vehicles can be equipped with electric energy storages to supply an electric drive unit of the vehicle with electric energy. Lithium-ion liquid electrolyte energy storages have been used primarily for this purpose to date. However, there are also alternative battery concepts, e.g. solid-state batteries.

Solid-state electrolyte energy storages are characterized by the fact that the liquid electrolyte of conventional Li-ion batteries is replaced by a solid-state electrolyte. This has a number of advantages: on the one hand, safety can be increased because the solid-state electrolyte is hardly flammable. On the other hand, the solid-state electrolyte enables the use of new anode materials that can provide a significant increase in energy density.

A possible solid-state electrolyte consists of a polymer. The energy density can be increased by using a lithium metal anode, while the cathode material $LiFePO4$ used ensures better cycle stability and increased safety. One disadvantage of the technology, however, is that sufficient conductivity of the electrolyte is only achieved from an operating temperature of around 60° C., which is relatively high for batteries. This fact requires the use of a heating system, which has a negative impact on the range of the vehicle due to the consumption of electric energy, since part of the battery capacity is required for heating.

US 2019/0356012 A1 discloses a hybrid battery pack architecture comprising at least two battery packs, at least one of which contains high operating temperature batteries. This pack serves as the primary energy pack for powering the vehicle during most of its normal operation. The other battery pack, also referred to as the boost pack, facilitates operation of the vehicle when the primary energy pack is cold. The boost pack consists of batteries that operate effectively at ambient temperatures. The boost pack provides electric energy to drive the vehicle after a cold start, and provides electric energy to a heater that warms the primary energy pack batteries to a temperature at which they can drive the vehicle.

The invention is based on the task of providing an alternative and/or improved technique for driving a motor vehicle, which preferably comprises improved thermo-management.

The task is solved by the features of the independent claims. Advantageous further embodiments are indicated in the dependent claims and the description.

One aspect of the present disclosure relates to a device for driving a motor vehicle, preferably a utility vehicle. The device comprises an electric drive unit for driving the motor vehicle. The device comprises a first electric energy storage comprising a first desired operating temperature (of, for example, 50° C. or 60° C. or more) and connected to the electric drive unit for supplying electric energy. The device comprises a second electrical energy storage comprising a second desired operating temperature (e.g., between 20° C. and 30° C.) lower than the first desired operating temperature and connected to the electric drive unit for supplying electric energy. The device comprises a heat transfer device by means of which the second electric energy storage and/or the electric drive unit can be coupled or is coupled to the first electric energy storage for transferring heat, preferably for heating the first electric energy storage by means of waste heat from the second electric energy storage and/or the electric drive unit.

The heat transfer device allows the device to comprise two different battery types in the form of the first and second electric energy storages in a vehicle. At least part of the heating requirement of the first electric energy storage can be covered by the waste heat of the second electric energy storage and/or the electric drive unit. The use of the heat transfer device can thus enable efficient operation of the first electric energy storage at a relatively high desired operating temperature by heating it using waste heat and efficient operation of the second electric energy storage at a lower desired operating temperature by cooling it to generate the waste heat. This creates a device adaptable to many ambient conditions and performance profiles. By hybridizing the two electric energy storages, energetic synergies can be exploited with the help of appropriate thermal management to achieve energy supply savings, ultimately increasing the range of the motor vehicle.

The heat transfer device allows the use of different waste heat sources to enable the use of new battery technologies with relatively high desired operating temperature, which enable both higher cycle stability and higher energy densities. In addition, higher energy efficiency can be achieved compared to battery systems with only one battery type. Intelligent control of the device by means of a control unit allows the device to be adapted to different applications based on its different battery systems. For example, in extreme ambient temperatures (e.g., desert-like conditions), it may be useful to operate only the first electrical energy storage. This could save energy for cooling the second electrical energy storage. Also, if not enough waste heat is generated to heat the first electric energy storage, only a portion of the heating demand could be met.

Preferably, the device for regulating, controlling and/or monitoring the device may comprise a control unit that adjusts the power requirement of the drive train according to demand and external influences, such as temperature, so that the energy stored in the first and second electric energy storages can be used as needed at any time.

Preferably, the term "control unit" may refer to an electronic unit (e.g., with microprocessor(s) and data storage) and/or a mechanical, pneumatic and/or hydraulic control unit, which, depending on its configuration, may perform control tasks and/or regulating tasks and/or processing tasks. Even if the term "control" is used herein, "control" or "control with feedback" and/or "processing" can also be included or meant, as it were, appropriately.

In one embodiment, the first electric energy storage is configured as a solid state electrolyte energy storage, preferably a polymer-based solid state electrolyte energy storage. Alternatively or additionally, the second electric energy storage is configured as a liquid electrolyte energy storage, preferably a lithium ion liquid electrolyte energy storage. This makes it possible to exploit the advantages of solid electrolyte energy storage systems mentioned at the beginning. Preferably, the poly-mer-based solid electrolyte energy storage system should be operated at an optimum temperature of at least 60° C. and a liquid electrolyte-based lithium-ion battery at 25° C. Under normal ambient conditions, it may therefore be necessary to cool the lithium-ion battery to keep it at operating temperature. By incorporating the additional solid-state electrolyte energy storage, the waste heat generated by the lithium-ion energy storage can be used to heat the solid-state electrolyte energy storage if required. Thus, the waste heat from the lithium-ion liquid electrolyte energy storage can be used efficiently and does not have to be dissipated via external coolers.

In a further embodiment, the heat transfer device is configured to cover a heating requirement of the first electric energy storage for reaching the first desired operating temperature at least partially by a cooling requirement of the second electric energy storage for reaching the second desired operating temperature and/or a cooling requirement of the electric drive unit (and e.g. power electronics).

In a further embodiment, the heat transfer device is configured to selectively couple the first electric energy storage with none, with one and with both of the second electric energy storage and the electric drive unit (and e.g. power electronics) for transferring heat, preferably depending on ambient conditions, power and/or load. Thus, efficient operations of the electric energy storages and the electric drive unit can be enabled for a wide variety of situations.

Preferably, the term "ambient condition dependent" may herein refer to a dependence on an ambient temperature and/or an ambient pressure. The ambient conditions may be detected, for example, by means of a sensor system of the motor vehicle.

Preferably, the expressions "power-dependent" and "load-dependent" may refer to a current and/or predicted power and/or or load of the first electric energy storage, the second electric energy storage, the power electronics and/or the electric drive unit.

In one embodiment, the device further comprises power electronics electrically connecting the electric drive unit to the first electric energy storage and the second electric energy storage.

By means of the heat transfer device, the first electric energy storage and the power electronics can be coupled or are coupled to each other for transferring heat. Thus, the waste heat of the power electronics can also be used to heat the first electric energy storage.

In a further embodiment, the heat transfer device comprises a heat transfer working fluid circuit with phase conversion of a working fluid, preferably a left-handed cold vapor process in the T s diagram. The heat transfer working fluid circuit can allow waste heat from a low temperature level (e.g. from the second electric energy storage) to be used to heat the first electric energy storage at a higher temperature level. This heat transfer working fluid circuit also offers the possibility to use further waste heat flows of the drive train. The electric drive unit and power electronics (operating temperature approx. 60° C.) in particular have a large amount of waste heat that can be additionally utilized and integrated into the heat transfer working fluid circuit, e.g. via an additional heat exchanger.

In a further embodiment, waste heat generated during cooling of the second electric energy storage to the second desired operating temperature and/or during cooling of the electric drive unit can be used to heat the first electric energy storage to the first desired operating temperature by means of the phase conversion in the heat transfer working fluid circuit.

In one embodiment, the heat transfer device comprises at least one of a first energy storage working fluid circuit (e.g., heating circuit) in which the first electric energy storage is arranged, a second energy storage working fluid circuit (e.g., cooling circuit) in which the second electric energy storage is arranged, and a drive unit working fluid circuit (e.g., cooling circuit) in which the electric drive unit is arranged, preferably with power electronics.

In a further embodiment, the heat transfer working fluid circuit, the first energy storage working fluid circuit, the second energy storage working fluid circuit and/or the drive unit working fluid circuit are fluidically separated from one another.

In a further embodiment, the first energy storage working fluid circuit, the second energy storage working fluid circuit and/or the drive unit working fluid circuit can be coupled or are coupled to one another by means of the heat transfer working fluid circuit for transferring heat.

In a further embodiment, the first energy storage working fluid circuit, the second energy storage working fluid circuit and/or the drive unit working fluid circuit are operable without phase conversion of the respective working fluid or are operated in such a manner.

In one embodiment, the heat transfer working fluid circuit and the first energy storage working fluid circuit are connected by means of a condenser in which the working fluid of the heat transfer working fluid circuit can be condensed while releasing heat to the first energy storage working fluid circuit.

In a further embodiment, the heat transfer working fluid circuit and the second energy storage working fluid circuit are connected by means of a (e.g. first) evaporator, in which the working fluid of the heat transfer working fluid circuit is (e.g. at least partially) evaporatable under heat supply from the second energy storage working fluid circuit.

In a further embodiment, the heat transfer working fluid circuit and the drive unit working fluid circuit are connected by means of a (e.g. second) evaporator, in which the working fluid of the heat transfer working fluid circuit is (e.g. at least partially) evaporatable under heat supply from the drive unit working fluid circuit.

For example, the first evaporator may be arranged (e.g. directly) upstream of the second evaporator.

In a further embodiment, the first energy storage working fluid circuit comprises an electric auxiliary heater, which is preferably suppliable with electric energy from the first and/or the second electric energy storages. The remaining heating requirement of the first electric energy storage can thus be provided by means of the electric auxiliary heater.

In one embodiment, at least one of the first energy storage working fluid circuit, the second energy storage working fluid circuit and/or the drive unit working fluid circuit comprises a cooler (e.g. ambient cooler) which can preferably be bypassed by means of a bypass. This increases the flexibility of the system. Under certain conditions, it may in fact be more sensible or even necessary not to carry out heat transfer by means of the heat transfer device and instead to cool the respective working fluid in a cooler.

Preferably, the first energy storage working fluid circuit, the second energy storage working fluid circuit and/or the drive unit working fluid circuit may further each comprise at least one three-way valve which, in one valve position, directs the respective working fluid to the evaporator/condenser and, in another valve position, directs the respective working fluid to the cooler.

For example, the condenser, the (first) evaporator and/or the (second) evaporator may be arranged in the bypass of the respective cooler of the working fluid circuit.

Preferably, the first energy storage working fluid circuit, the second energy storage working fluid circuit and/or the drive unit working fluid circuit may further comprise a pump and/or an expansion tank.

In a further embodiment, the heat transfer device is configured (e.g., by means of a control unit) to mutually coordinate operations (e.g., flow rates, valve positions, and/or heating power of the electric auxiliary heater) of the working fluid circuits such that the temperature requirements of the electric drive unit, the first electric energy storage, and the second electric energy storage (and e.g., power electronics) are mutually met, preferably ambient condition-dependent, power-dependent, and/or load-dependent.

Another aspect of the present disclosure relates to a motor vehicle, preferably a utility vehicle (e.g., truck or bus), comprising a device as disclosed herein.

Another aspect of the present disclosure relates to a method of operating a device for driving a motor vehicle, preferably as disclosed herein, comprising an electric drive unit, a first electric energy storage comprising a first desired operating temperature (of e.g. 50° C. or 60° C. or more) and connected to the electric drive unit for supplying electric energy, and a second electric energy storage comprising a second desired operating temperature (e.g., between 20° C. and 30° C.) lower than the first desired operating temperature and connected to the electric drive unit for supplying electric energy. The method comprises transferring waste heat from the electric drive unit and/or the second electric energy storage to the first electric energy storage, preferably in an ambient condition-dependent, power-dependent and/or load-dependent manner.

Figure 2:
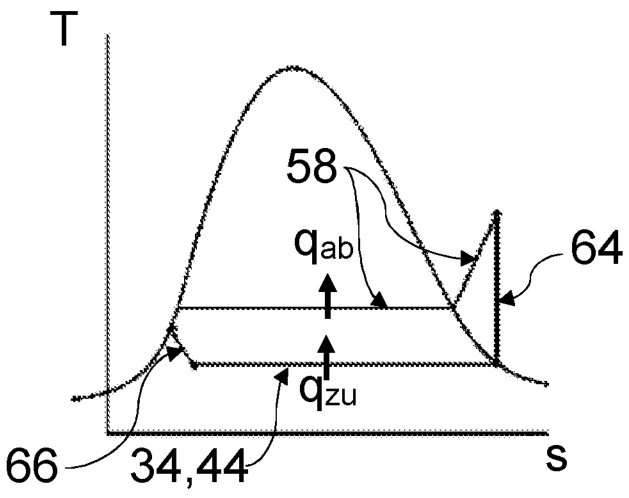

The preferred embodiments and features of the invention described above may be combined in any desired manner. Further details and advantages of the invention are described below with reference to the accompanying drawings. They show:

FIG. 1 a schematic representation of a device for driving a motor vehicle according to an embodiment of the present disclosure; and FIG. 2 a T-s diagram (temperature-specific entropy diagram) for explaining an operation of a heat transfer device of the exemplary device.

FIG. 1 shows a device 10 for driving a motor vehicle. The motor vehicle is preferably a utility vehicle, for example a truck or a bus.

The device 10 comprises an electric drive unit 12, a first electric energy storage 14, a second electric energy storage 16, and a heat transfer device 18.

The electric drive unit 12 is connected to wheels of the motor vehicle for driving the motor vehicle. For example, the electric drive unit 12 may be configured as a central electric drive unit 12. However, it is also possible that the electric drive unit 12 additionally or alternatively comprises a plurality of electric wheel hub motors or motors close to the wheels.

The first electric energy storage 14 and the second electric energy storage 16 serve as traction batteries of the motor vehicle. The first electric energy storage 14 and the second electric energy storage 16 are connected to the electric drive unit 12 for supplying electric energy. Power electronics 20 may be interposed between the electric energy storages 14, 16 and the electric drive unit 12. The power electronics 20 may comprise, for example, a DC-DC converter, a high-voltage power distributor, and/or a high-voltage on-board grid. It is possible that in addition to the power electronics 20, an on-board charger (OBC) is also included, which is connected to the power electronics 20 for electrically charging the electrical energy storages 14, 16 (not shown).

The first electric energy storage 14 comprises a first desired operating temperature at which the first electric energy storage 14 can be effectively operated. The second electric energy storage 16 comprises a second desired operating temperature at which the second electric energy storage 16 can be effectively operated. The first desired operating temperature is substantially higher than the second desired operating temperature. For example, the first desired operating temperature may be in a portion 50° C. or 60° C., for example about 60° C. For example, the second desired operating temperature may be at ambient temperature and/or, for example, between 20° C. and 30° C., preferably at 25° C.

Preferably, the first electric energy storage 14 is configured as a solid-state energy storage, preferably a polymer-based solid-state energy storage. Preferably, the second electric energy storage 16 is configured as a liquid electrolyte energy storage, preferably a lithium ion liquid electrolyte energy storage. However, it is also possible for the energy storage 14, 16 to be configured differently, with the first electric energy storage 14 comprising a higher, preferably substantially higher, desired operating temperature than the second electric energy storage 16.

The heat transfer device 18 is configured to heat the first electric energy storage 14 by heat transfer from at least one other component of the device 10 during normal ambient conditions. During normal ambient conditions, the electric drive unit 12, the second electric energy storage 16 and, if applicable, the power electronics 20 are to be cooled. The heat transfer device 18 may thus allow a heating requirement of the first electric energy storage 14 to reach the first desired operating temperature to be at least partially met by a cooling requirement of the second electric energy storage 16, a cooling requirement of the electric drive unit 12, and/or a cooling requirement of the power electronics 20. In addition to the first electric energy storage 14, the heat transfer device 18 can therefore be connected or connectable in a heat-transferring manner to the second electric energy storage and/or the electric drive unit 12 and, if applicable, to the power electronics 20. In the illustrated embodiment example of FIG. 1, the heat transfer device 18 can couple the first electric energy storage 14 to the second electric energy storage 16, the electric drive unit 12 and the power electronics 20 to each other for transferring heat.

The heat transfer device 18 may comprise a control unit 19 that may adjust an operation of the heat transfer device 18. The control unit 19 may be in signal communication with valves of the heat transfer device 18 to adjust valve positions of the valves. The control unit 19 may be in signal connection with conveying devices (pumps and/or compressors) of the heat transfer device 18 to adjust a conveying power of the conveying devices, for example by adjusting a rotational speed of the respective conveying device.

The following describes the embodiment example for the heat transfer device 18 shown in FIG. 1. The following explanations therefore relate to a particularly preferred embodiment example, but are purely exemplary. Of course, the heat transfer device 18 can also be configured in a modified manner as long as it preferably enables the first electric energy storage 14 on the one hand and the second electric energy storage 16 and/or the electric drive unit 12 on the other hand to be coupled to one another for the purpose of transferring heat, particularly preferably for the purpose of heating the first electric energy storage 14 by means of waste heat from the second electric energy storage 16 and/or the electric drive unit 12.

Exemplarily, the heat transfer device 18 may comprise four working fluid circuits 22, 24, 26, and 28. It is possible for the heat transfer device 18 to comprise fewer than the four working fluid circuits 22, 24, 26 and 28, for example only the working fluid circuits 22, 26, 28 or only the working fluid circuits 24, 26 and 28. It is also possible for the heat transfer device 18 to comprise at least one additional or alternative working fluid circuit, for example if the power electronics 20 are assigned their own working fluid circuit for cooling the power electronics 20 or if further components of the motor vehicle to be cooled or heated are integrated into the heat transfer device 18.

The working fluid circuits 22, 24, 26 and 28 are preferably fluidically separated from each other, as shown in FIG. 1. However, it is also possible that the working fluid circuits 22, 24, 26 and 28 are at least partially fluidically connected to each other. For example, the working fluid circuits 22 and 24 may be fluidically connected or integrated with each other, or the working fluid circuits 22, 24 and 26 may be fluidically connected or integrated with each other, or the working fluid circuits 22, 24, 26 and 28 may be fluidically connected or integrated with each other.

The working fluid circuit 22 is a circuit for temperature control of the second electric energy storage 16. In particular, the working fluid circuit 22 may be a cooling circuit for the second electric energy storage 16. The second electric energy storage 16 is arranged in the working fluid circuit 22. Usefully, the working fluid circuit 22 is also referred to herein as the second energy storage working fluid circuit 22.

In addition to the second energy storage 16, the working fluid circuit 22 may additionally comprise a pump 30, a three-way valve 32, an evaporator (heat exchanger) 34, a cooler (heat exchanger) 36, and an expansion tank 38. It is possible that the working fluid circuit 22 may comprise other components, such as valves, check valves, sensors, etc., necessary for proper operation of the working fluid circuit 22 (not shown in FIG. 1).

The pump 30 is arranged directly upstream of the second electric energy storage 16. The pump 30 is arranged directly downstream of the cooler 36 and the evaporator 34. The pump 30 is configured to pump a liquid working fluid through the working fluid circuit 22. Preferably, a liquid, for example a water/glycol mixture, an oil or other liquid, circulates in the working fluid circuit 22. The working fluid preferably circulates in the working fluid circuit 22 without phase change. A flow rate of the pump 30, and thus a flow rate through the working fluid circuit 22, may be adjustable, for example by adjusting a speed of the pump 30. A flow rate of the pump 30 may be adjusted by the control unit 19 of the heat transfer device 18.

The three-way valve 32 is arranged directly downstream of the second electric energy storage 16. The three-way valve 32 is arranged directly upstream of the evaporator 34 and the cooler 36. The three-way valve 32 comprises an inlet port and two outlet ports. The inlet port is connected to the second electric energy storage 16. The first outlet port is connected to the evaporator 34. The second outlet port is connected to the cooler 36. Depending on valve positions, the three-way valve 32 can selectively pass the working fluid received from the second electric energy storage 16 to the evaporator 34 and to the cooler 36 (and optionally to both the evaporator 34 and the cooler 36). In a first valve position of the three-way valve 32, the received working fluid may be directed to the evaporator 34. In a second valve position of the three-way valve 32, the received working fluid can be forwarded to the cooler 36. In a possible third valve position of the three-way valve 32, the received working fluid can be passed to both the evaporator 34 and the cooler 36. A valve position of the three-way valve 32 may be adjusted by the control unit 19 of the heat transfer device 18.

The evaporator 34 is arranged directly downstream of the three-way valve 32, preferably the first outlet port of the three-way valve 32. The evaporator 34 is connected or arranged in parallel with the cooler 36. In the evaporator 34, the working fluid of the working fluid circuit 22 can be cooled. The working fluid of the working fluid circuit 22 preferably does not undergo a phase change. Heat from the working fluid of the working fluid circuit 22 can be transferred to the working fluid of the working fluid circuit 28 in the evaporator 34. The working fluid of the working fluid circuit 28 may thereby be evaporated in the evaporator 34, thus undergoing a phase change from liquid to gaseous/vapor.

The cooler 36 is arranged directly downstream of the three-way valve 32, preferably the second outlet port of the three-way valve 32. In the cooler 36, the working fluid of the working fluid circuit 22 can be cooled. The cooler 36 is arranged in a bypass that bypasses the evaporator 34. The cooler 36 is preferably an ambient cooler.

The expansion tank 38 is connected to the working fluid circuit 22, preferably at a line section directly upstream of the pump 30. The expansion tank 38 may, for example, compensate for a temperature-induced increase or decrease in volume of the working fluid in the working fluid circuit 22.

The working fluid circuit 22 may be operated in at least two modes. In each of the modes, a flow rate of the working fluid through the working fluid circuit 22 may additionally be adjusted by adjusting a flow rate of the pump 30. For example, the control unit 19 can specify a desired mode and/or a desired flow rate for the working fluid circuit 22, in particular by adjusting a valve position of the three-way valve 32 and/or adjusting a speed of the pump 30.

In a first mode of the working fluid circuit 22, the working fluid is heated by the second electric energy storage 16. In this mode, the second electric energy storage 16 may be cooled. Preferably, the second electric energy storage 16 can thus maintain the second desired operating temperature. The heated working fluid is directed by the three-way valve 32 only to the evaporator 34. The heated working fluid is cooled in the evaporator 34, allowing the working fluid of the working fluid circuit 28 to be evaporated. The cooled working fluid of the working fluid circuit 22 is conveyed by the pump 30 to the second electric energy storage 16 for reheating.

In a second mode of the working fluid circuit 22, the working fluid is heated by the second electric energy storage 16, similar to the first mode. The heated working fluid is directed by the three-way valve 32 to the cooler 36 only. The heated working fluid is cooled in the cooler 36. The cooled working fluid of the working fluid circuit 22 is conveyed by the pump 30 to the second electric energy storage 16 for reheating.

In a possible third mode of the working fluid circuit 22, the working fluid is heated by the second electrical energy storage 16, similar to the first and second modes. The heated working fluid is split by the three-way valve 32 and directed to both the evaporator 34 and the cooler 36. The heated working fluid (first partial flow) is cooled in the evaporator 34, allowing the working fluid of the working fluid circuit 28 to be evaporated. The heated working fluid (second partial flow) is cooled in the cooler 36. The cooled working fluid (combination of the first and second partial flows) of the working fluid circuit 22 is conveyed by the pump 30 to the second electric energy storage 16 for reheating.

The working fluid circuit 24 is a circuit for tempering the electric drive unit 12 and, if applicable, the power electronics 20. In particular, the working fluid circuit 24 may be a cooling circuit for the electric drive unit 12 and the power electronics 20. The electric drive unit 12 and the power electronics 20 are arranged in the working fluid circuit 24. Expediently, the working fluid circuit 24 is also referred to herein as the drive unit working fluid circuit 24.

In addition to the electric drive unit 12, the working fluid circuit 24 may additionally comprise a pump 40, a three-way valve 42, an evaporator (heat exchanger) 44, a cooler (heat exchanger) 46, and an expansion tank 48. It is possible that the working fluid circuit 24 may comprise other components, such as valves, check valves, sensors, etc., necessary for proper operation of the working fluid circuit 24 (not shown in FIG. 1).

The pump 40 is arranged directly upstream of the electric drive unit 12 (and power electronics 20, if applicable). The pump 40 is arranged directly downstream of the cooler 46 and the evaporator 44. The pump 40 is configured to pump a liquid working fluid through the working fluid circuit 24. Preferably, a liquid, for example a water/glycol mixture, an oil or other liquid, circulates in the working fluid circuit 24. The working fluid preferably circulates in the working fluid circuit 24 without phase change. A flow rate of the pump 40, and thus a flow rate through the working fluid circuit 24, may be adjustable, for example by adjusting a speed of the pump 40. A flow rate of the pump 40 may be adjusted by the control unit 19 of the heat transfer device 18.

The three-way valve 42 is arranged directly downstream of the electric drive unit 12 (and power electronics 20, if applicable). The three-way valve 42 is arranged directly upstream of the evaporator 44 and the cooler 46. The three-way valve 42 comprises an inlet port and two outlet ports. The inlet port is connected to the electric drive unit 12 (and power electronics 20, if applicable). The first outlet port is connected to the evaporator 44. The second outlet port is connected to the cooler 46. Depending on valve positions, the three-way valve 42 can selectively pass the working fluid received from the electric drive unit 12 to the evaporator 44 and to the cooler 46 (and optionally to both the evaporator 44 and the cooler 46). In a first valve position of the three-way valve 42, the received working fluid may be directed to the evaporator 44. In a second valve position of the three-way valve 42, the received working fluid can be forwarded to the cooler 46. In a possible third valve position of the three-way valve 42, the received working fluid can be directed to both the evaporator 44 and the cooler 46. A valve position of the three-way valve 42 can be adjusted by the control unit 19 of the heat transfer device 18.

The evaporator 44 is arranged directly downstream of the three-way valve 42, preferably the first outlet port of the three-way valve 42. The evaporator 44 is connected or arranged in parallel with the cooler 46. In the evaporator 44, the working fluid of the working fluid circuit 24 can be cooled. Preferably, the working fluid of the working fluid circuit 24 does not undergo a phase change. Heat from the working fluid of the working fluid circuit 24 may be transferred to the working fluid of the working fluid circuit 28 in the evaporator 44. The working fluid of the working fluid circuit 28 may thereby be evaporated (or further evaporated or superheated) in the evaporator 44, for example undergoing a phase change from liquid to gaseous/vapor.

The cooler 46 is arranged directly downstream of the three-way valve 42, preferably the second outlet port of the three-way valve 42. In the cooler 46, the working fluid of the working fluid circuit 22 can be cooled. The cooler 46 is arranged in a bypass that bypasses the evaporator 44. The cooler 46 is preferably an ambient cooler.

The expansion tank 48 is connected to the working fluid circuit 24, preferably at a line section directly upstream of the pump 40. The expansion tank 48 may, for example, compensate for a temperature-induced increase or decrease in volume of the working fluid in the working fluid circuit 24.

The working fluid circuit 24 may be operated in at least two modes. In each of the modes, a flow rate of the working fluid through the working fluid circuit 24 may additionally be adjusted by adjusting a flow rate of the pump 40. For example, the control unit 19 can specify a desired mode and/or a desired flow rate for the working fluid circuit 24, in particular by adjusting a valve position of the three-way valve 42 and/or adjusting a speed of the pump 40.

In a first mode of the working fluid circuit 24, the working fluid is warmed up by the electric drive unit 12 (and possibly the power electronics 20). In this process, the electric drive unit 12 (and, if applicable, the power electronics 20) may be cooled. Preferably, the electric drive unit 12 and the power electronics 20 can thus maintain a desired operating temperature. The heated working fluid is directed by the three-way valve 42 only to the evaporator 44. The heated working fluid is cooled in the evaporator 44, allowing the working fluid of the working fluid circuit 28 to be evaporated (further evaporated or superheated). The cooled working fluid of the working fluid circuit 24 is conveyed by the pump 40 to the electric drive unit 12 for reheating.

In a second mode of the working fluid circuit 24, the working fluid is heated by the second energy storage 16 (and possibly the power electronics 20), comparable to the first mode. The heated working fluid is directed by the three-way valve 42 only to the cooler 46. The heated working fluid is cooled in the cooler 46. The cooled working fluid of the working fluid circuit 24 is conveyed by the pump 40 to the electric drive unit 12 for reheating.

In a possible third mode of the working fluid circuit 24, the working fluid is heated by the electric drive unit 12 (and possibly the power electronics 20), comparable to the first and second modes. The heated working fluid is split by the three-way valve 42 and directed to both the evaporator 44 and the cooler 46. The heated working fluid (first partial flow) is cooled in the evaporator 44, allowing the working fluid of the working fluid circuit 28 to be evaporated, further evaporated, or superheated. The heated working fluid (second partial flow) is cooled in the cooler 46. The cooled working fluid (combination of the first and second partial flows) of the working fluid circuit 24 is conveyed by the pump 40 to the electric drive unit 12 for reheating.

The working fluid circuit 26 is a circuit for temperature control of the first electric energy storage 14. In particular, the working fluid circuit 26 may be a heating circuit for the first electric energy storage 14, which may also allow cooling of the first electric energy storage 14 if desired in extreme ambient conditions. The first electric energy storage 14 is arranged in the working fluid circuit 26. Expediently, the working fluid circuit 26 is also referred to herein as the first energy storage working fluid circuit 26.

In addition to the first energy storage 14, the working fluid circuit 26 may further comprise a pump 50, a first three-way valve 52 (optional), a cooler (heat exchanger) 54 (optional), a second three-way valve 56, a condenser (heat exchanger)

58, an electric auxiliary heater 60, and an expansion tank 62. It is possible that the working fluid circuit 26 may comprise other components, such as valves, check valves, sensors, etc., necessary for proper operation of the working fluid circuit 26 (not shown in FIG. 1).

The pump 50 is arranged directly upstream of the first electric energy storage 14. The pump 50 is arranged directly downstream of the condenser 58. The pump 50 is configured to pump a liquid working fluid through the working fluid circuit 26. Preferably, a liquid, for example a water/glycol mixture, an oil or other liquid, circulates in the working fluid circuit 26. The working fluid preferably circulates in the working fluid circuit 26 without phase change. A flow rate of the pump 50 and thus a flow rate through the working fluid circuit 26 may be adjustable, for example by adjusting a speed of the pump 50. A flow rate of the pump 50 may be adjusted by the control unit 19 of the heat transfer device 18.

The (first) three-way valve 52 is arranged directly downstream of the first electric energy storage 14. The three-way valve 52 is arranged directly upstream of the cooler 54 and a bypass bypassing (only) the cooler 54. The three-way valve 52 comprises an inlet port and two outlet ports. The inlet port is connected to the first electric energy storage 14. The first outlet port is connected to the cooler 54. The second outlet port is connected to the bypass of the cooler 54. Depending on valve positions, the three-way valve 52 can selectively direct the working fluid received from the first electrical energy storage 14 to the cooler 54 and to the bypass of the cooler 54 (and optionally to both the cooler 54 and the bypass of the cooler 54). In a first valve position of the three-way valve 52, the received working fluid may be directed to the cooler 54. In a second valve position of the three-way valve 52, the received working fluid can be directed to the bypass of the cooler 54. In a possible third valve position of the three-way valve 52, the received working fluid may be directed to both the cooler 54 and the bypass of the cooler 54. A valve position of the three-way valve 42 can be adjusted by the control unit 19 of the heat transfer device 18. By means of the first three-way valve 52, it can be ensured that the first electric energy storage 14 can also be cooled via the cooler 54 under extreme ambient conditions.

The (second) three-way valve 56 is arranged directly downstream of the cooler 54 and the three-way valve 52 (if present). Alternatively, the three-way valve 56 may be arranged directly downstream of the first electric energy storage 14, for example. The three-way valve 56 is arranged directly upstream of the condenser 58 and a bypass bypassing (only) the condenser 58. The three-way valve 56 comprises an inlet port and two outlet ports. The inlet port receives working fluid from the cooler 54, the bypass of the cooler 54, or the first electrical energy storage 14. The first outlet port is connected to the condenser 58. The second outlet port is connected to the bypass of the condenser 58. Depending on valve positions, the three-way valve 56 can selectively pass the received working fluid to the condenser 58 and to the bypass of the condenser 58 (and optionally to both the condenser 58 and the bypass of the condenser 58). In a first valve position of the three-way valve 56, the received working fluid may be directed to the condenser 58. In a second valve position of the three-way valve 56, the received working fluid can be forwarded to the bypass of the condenser 58. In a possible third valve position of the three-way valve 56, the received working fluid may be directed to both the condenser 58 and the bypass of the condenser 58. A valve position of the three-way valve 56 can be adjusted by the control unit 19 of the heat transfer device 18. The second three-way valve 56 can ensure that the working fluid does not pass through the condenser 58 and heat up the working fluid or, depending on the operating point, heat up the working fluid itself.

The condenser 58 is arranged directly downstream of the three-way valve 56, preferably the first outlet port of the three-way valve 56. The condenser 58 may be connected or arranged in series with the cooler 54 or the bypass of the cooler 54 (if present). A parallel connection is also possible. The working fluid of the working fluid circuit 26 can be heated in the condenser 58. The working fluid of the working fluid circuit 26 preferably does not undergo a phase change. Heat from the working fluid of the working fluid circuit 28 can be transferred to the working fluid of the working fluid circuit 26 in the condenser 58. The working fluid of the working fluid circuit 28 may thereby be condensed in the condenser 58, e.g. undergo a phase change from gaseous/vaporous to liquid.

The electric auxiliary heater 60 is arranged directly downstream of the pump 50. The electric auxiliary heater 60 is arranged directly upstream of the first electric energy storage 14. The electric auxiliary heater 60 can heat the working fluid of the working fluid circuit 26, if still required, so that the first electric energy storage 14 can be heated to the first desired operating temperature. The electric auxiliary heater 60 may be supplied with electric energy from the second electric energy storage 16, preferably during a cold start of the motor vehicle. The electric auxiliary heater 60 may be supplied with electric energy from the first electric energy storage 14, preferably when an actual operating temperature of the first electric energy storage 14 already corresponds to the first desired operating temperature and auxiliary heating is required. The auxiliary heater 60 can be switched in as required by the control unit 19 for the heating requirement of the first electrical energy storage 14. Thus, a support by the auxiliary heater 60 of 0-100% of the heating demand can be ensured.

The expansion tank 62 is connected to the working fluid circuit 26, preferably at a line section directly downstream or upstream of the first electric energy storage 14. The expansion tank 62 can, for example, compensate for a temperature-related increase or decrease in volume of the working fluid in the working fluid circuit 26.

The working fluid circuit 26 may be operated in a plurality of modes. In each of the modes, a flow rate of the working fluid through the working fluid circuit 26 may additionally be adjusted by adjusting a flow rate of the pump 50. For example, the control unit 19 can specify a desired mode and/or a desired flow rate for the working fluid circuit 26, in particular by adjusting a valve position of the three-way valves 52, 56 and/or adjusting a speed of the pump 50.

In a first mode of the working fluid circuit 26, the working fluid is pumped by the pump 50 through the electric auxiliary heater 60, the first electric energy storage 14, the cooler bypass 54, and the condenser 58. The three-way valve 52 directs the working fluid only to the bypass of the cooler 54. The three-way valve 56 directs the working fluid only to the condenser 58. The working fluid may be heated in the condenser 58. If necessary, the heated working fluid can be further heated in the electric auxiliary heater 60. The heated working fluid may heat the first electric energy storage 14 so that the first electric energy storage 14 may maintain the first desired operating temperature. The cooled working fluid of the working fluid circuit 26 is conveyed by the pump 50 to the condenser 58 for reheating.

In a second (optional) mode of the working fluid circuit 26, the working fluid is pumped by the pump 50 through the electric auxiliary heater 60, the first electric energy storage 14, the bypass of the cooler 54, and the bypass of the condenser 58. The three-way valve 52 directs the working fluid to the cooler bypass 54 only. The three-way valve 56 directs the working fluid to the condenser bypass 58 only. The working fluid may be heated in the electric auxiliary heater 60. The heated working fluid can heat the first electric energy storage 14 so that the first electric energy storage 14 can maintain the first desired operating temperature. The cooled working fluid of the working fluid circuit 26 is conveyed by the pump 50 to the electric auxiliary heater 60 for reheating.

In a third (optional) mode of the working fluid circuit 26, the working fluid is pumped by the pump 50 through the electric auxiliary heater 60, the first electric energy storage 14, the cooler 54, and the bypass of the condenser 58. The third mode may be used particularly in very hot ambient conditions where the ambient temperature is higher than the first desired operating temperature. The three-way valve 52 directs the working fluid to the cooler 54 only. In the cooler 54, the working fluid is cooled. The three-way valve 56 directs the working fluid only to the bypass of the condenser 58. The cooled working fluid can cool the first electric energy storage 14 so that the first electric energy storage 14 can maintain the desired first operating temperature. The heated working fluid of the working fluid circuit 26 is conveyed by the pump 50 to the cooler 54 for renewed cooling.

It is possible that, depending on the requirement, in the first mode, in the second mode or in the third mode, the three-way valves 52, 56 divide the working fluid received in each case, i.e. forward it to the respective bypass as well as to the cooler 54 or the condenser 58.

The working fluid circuit 28 is a circuit for transferring heat from the working fluid circuits 22 and 24 (and thus the second electric energy storage 16, the electric drive unit 12 and the power electronics 20) to the working fluid circuit 26. Expediently, the working fluid circuit 28 is also referred to herein as the heat transfer working fluid circuit 28.

The working fluid circuit 28 is included to utilize the various waste heat flows from the second electric energy storage 16, the electric drive unit 12, and the power electronics 20. Preferably, a phase change of the circulating fluid occurs in the working fluid circuit 28. The phase change of the working fluid also allows heat flows against the temperature gradient. This effect comes into play in the context of the present disclosure in that the waste heat of the second electric energy storage 16 comprises a significantly lower temperature level than the first electric energy storage 14 (compare first and second desired operating temperatures).

In addition to the evaporators 34, 44 and the condenser 58, the working fluid circuit 28 comprises a compressor 64 and a throttle 66. It is possible that the working fluid circuit 28 comprises other components, such as valves, check valves, sensors, etc., necessary for proper operation of the working fluid circuit 28 (not shown in FIG. 1).

The compressor 64 is arranged directly downstream of the evaporator 44, which in turn is arranged directly downstream of the evaporator 34. The compressor 64 is arranged di-rectly upstream of the condenser 58. The compressor 64 is configured to convey a gaseous working fluid through the working fluid circuit 26. Preferably, the working fluid circuit 28 circulates a fluid that can evaporate in the evaporators 34, 44 and condense in the condenser 58 as it circulates, for example, an ammonia mixture or a silicone oil. A flow rate of the compressor 64, and thus a flow rate through the working fluid circuit 28, may be adjustable, for example by adjusting a rotational speed of the compressor 64. A flow rate of the compressor 64 may be adjusted by the control unit 19 of the heat transfer device 18.

The throttle 66 is arranged directly downstream of the condenser. The throttle 66 is arranged directly upstream of the evaporator 34. The throttle causes the liquid working fluid to expand. During expansion, partial evaporation of the working fluid may already occur. The throttle 66 can be configured as an expansion valve, for example.

FIG. 2 shows the left-hand cold vapor process preferably carried out in the working fluid circuit 28 in a T s diagram.

The evaporators 34, 44 evaporate the working fluid at a low temperature and pressure level by supplying heat from the working fluid circuits 22 and 24 to cool the second energy storage 16, the electric drive unit 16 and the power electronics 20. The compressor 64 compresses the working fluid. In the condenser 58, the working fluid is cooled, condensed (and possibly subcooled) at a high temperature and pressure level (compared to the heat supply by means of the evaporators 34, 44). In the process, heat is transferred to the working fluid circuit 26 for heating the first energy storage 14. In the throttle 66, expansion of the liquid phase occurs, with partial evaporation taking place, preferably as an isenthalpic change of state.

The heat transfer device 18 enables particularly efficient use of the waste heat of the vehicle, since the evaporator 44 is still arranged downstream of the evaporator 34, which can use the waste heat of the electric drive unit 12 and the power electronics 20. Thus, it can be ensured, for example, that the working fluid in the working fluid circuit 28 evaporates completely.

On the other hand, the heat transfer device 18 also allows that the heat transfer is not or at least partially not used in special situations. For example, it is possible to cool the working fluid in the working fluid circuits 22, 24 via the coolers 36 and 46, respectively. For this purpose, the three-way valves 32 or 42 can be adjusted accordingly by the control unit 19, depending on whether the waste heat is to be dissipated via the coolers 36 or 46 or is to reach the first electrical energy storage 14 in the working fluid circuit 26 via the working fluid circuit 28.

To achieve full efficiency of the concept, the control unit 19 may be configured to control the pumps 30, 40 and 50, the compressor 64, and the valves 32, 42, 52, 56 (if any) to match the operation to the ambient conditions (esp. ambient temperature and ambient pressure) and the power requirements of the components (energy storages 14 and 16, power electronics 20 and electric drive unit 12). Sensors (not shown separately) can be used to detect important parameters for this purpose, such as ambient temperature and pre-run temperatures of the circuits, and to communicate them to the control unit 19.

The invention is not limited to the preferred embodiments described above. Rather, a large number of variants and variations are possible which also make use of the idea of the invention and therefore fall within the scope of protection. In particular, the invention also claims protection for the subject matter and the features of the sub-claims independently of the claims referred to. In particular, the individual features of independent claim 1 are each independently disclosed. Additionally, the features of the subclaims are also disclosed independently of all of the features of independent claim 1 and, for example, independently of the features relating to the presence and/or configuration of the electric drive unit, the first electric energy storage, the second electric energy storage, and/or the heat transfer device of independent claim 1. All range indications herein are to be disclosed in such a way that, as it were, all values falling within the respective portion are disclosed individually, e.g. also as respective preferred narrower outer limits of the respective portion.

LIST OF REFERENCE SIGNS

10 Device for driving the motor vehicle
12 Electric drive unit
14 First energy storage
16 Second energy storage
18 Heat transfer device
19 Control unit
20 Power electronics
22 Working fluid circuit
24 Working fluid circuit
26 Working fluid circuit
28 Working fluid circuit
30 Pump
32 Three-way valve
34 Evaporator
36 Cooler
38 Expansion tank
40 Pump
42 Three-way valve
44 Evaporator
46 Cooler
48 Expansion tank
50 Pump
52 First three-way valve
54 Cooler
56 Second three-way valve
58 Condenser
60 Electric auxiliary heater
62 Expansion tank
64 Compressor
66 Throttle

The invention claimed is:

1. A device for driving a motor vehicle comprising:
an electric drive unit for driving the motor vehicle;
a first electric energy storage comprising a first desired operating temperature and being connected to the electric drive unit for supplying electric energy;
a second electric energy storage comprising a second desired operating temperature lower than the first desired operating temperature and connected to the electric drive unit for supplying electric energy; and
a heat transfer device by means of which the second electric energy storage and/or the electric drive unit are couplable or coupled to the first electric energy storage for transferring heat, wherein the heat transfer device comprises:
a first energy storage working fluid circuit in which the first electric energy storage is arranged; and
a second energy storage working fluid circuit in which the second electric energy storage is arranged.

2. The device according to claim 1, wherein:
the motor vehicle is a utility vehicle; and/or
the heat transfer device transfers heat for heating the first electric energy storage by means of waste heat from the second electric energy storage and/or the electric drive unit; and/or
the first electric energy storage is configured as a solid state electrolyte energy storage; and/or
the second electric energy storage is configured as a liquid electrolyte energy storage.

3. The device according to claim 1, wherein:
the first electric energy storage is configured as a polymer-based solid state electrolyte energy storage; and/or
the second electric energy storage is configured as a lithium-ion liquid electrolyte energy storage; and/or
the heat transfer device is configured to cover a heating requirement of the first electric energy storage for reaching the first desired operating temperature at least partially by a cooling requirement of the second electric energy storage for reaching the second desired operating temperature and/or a cooling requirement of the electric drive unit.

4. The device according to claim 1, wherein:
the heat transfer device is configured to selectively couple the first electric energy storage to none, to one and to both of the second electric energy storage and the electric drive unit for transferring heat.

5. The device according to claim 4, wherein the transferring of heat is ambient condition dependent, power dependent and/or load dependent.

6. The device according to claim 1, further comprising:
power electronics electrically connecting the electric drive unit to the first electric energy storage and the second electric energy storage;
wherein by means of the heat transfer device the first electric energy storage and the power electronics can be coupled or are coupled to one another for transferring heat.

7. The device according to claim 1, wherein:
the heat transfer device comprises a heat transfer working fluid circuit with a phase conversion of a working fluid.

8. The device according to claim 7, wherein:
by means of the phase conversion in the heat transfer working fluid circuit, a waste heat produced during cooling of the second electric energy storage to the second desired operating temperature and/or during cooling of the electric drive unit can be used to heat the first electric energy storage to the first desired operating temperature; and/or
the phase conversion of the working fluid is a left-handed cold vapor process in the Ts diagram.

9. The device according to claim 1, wherein the heat transfer device further comprises a drive unit working fluid circuit in which the electric drive unit is arranged.

10. The device according to claim 9, wherein:
the heat transfer working fluid circuit, the first energy storage working fluid circuit, the second energy storage working fluid circuit and/or the drive unit working fluid circuit are fluidically separated from one another; and/or
by means of the heat transfer working fluid circuit, the first energy storage working fluid circuit, the second energy storage working fluid circuit and/or the drive unit working fluid circuit can be coupled or are coupled to one another for the transfer of heat; and/or
the first energy storage working fluid circuit, the second energy storage working fluid circuit and/or the drive unit working fluid circuit are operable or are operated without phase conversion of the respective working fluid; and/or
the electric drive unit is arranged with power electronics.

11. The device according to claim 9, wherein:
the heat transfer working fluid circuit and the first energy storage working fluid circuit are connected by means of a condenser in which the working fluid of the heat transfer working fluid circuit is condensable while releasing heat to the first energy storage working fluid circuit; and/or the heat transfer working fluid circuit and the second energy storage working fluid circuit are connected by means of an evaporator in which the working fluid of the heat transfer working fluid circuit is evaporatable with heat supply from the second energy storage working fluid circuit; and/or the heat transfer working fluid circuit and the drive unit working fluid circuit are connected by means of an evaporator in which the working fluid of the heat transfer working fluid circuit is evaporatable under heat supply from the drive unit working fluid circuit.

12. The device according to claim 9, wherein:

the first energy storage working fluid circuit comprises an electric auxiliary heater.

13. The device according to claim 9, wherein:

at least one of the first energy storage working fluid circuit, the second energy storage working fluid circuit and/or the drive unit working fluid circuit comprises a cooler.

14. The device according to claim 9, wherein:

the heat transfer device is configured to mutually coordinate operations of the working fluid circuits in such a way that the temperature requirements of the electric drive unit, the first electric energy storage and the second electric energy storage are mutually covered.

15. The device according to claim 9, wherein:

the first energy storage working fluid circuit comprises an electric auxiliary heater supplyable with electric energy from the first and/or the second electric energy storage; and/or at least one of the first energy storage working fluid circuit, the second energy storage working fluid circuit and/or the drive unit working fluid circuit comprises a cooler bypassable by a bypass; and/or the heat transfer device is configured to mutually coordinate operations of the working fluid circuits in such a way that the temperature requirements of the electric drive unit, the first electric energy storage and the second electric energy storage are mutually covered and ambient condition dependent, power-dependent and/or load-dependent.

16. A motor vehicle comprising:

a device according to claim 1.

17. The motor vehicle of claim 16, wherein the motor vehicle is a utility vehicle.

18. A method for operating a device for driving a motor vehicle comprising an electric drive unit for driving the motor vehicle, a first electric energy storage comprising a first desired operating temperature and connected to the electric drive unit for supplying electric energy, and a second electric energy storage comprising a second desired operating temperature lower than the first desired operating temperature and connected to the electric drive unit for supplying electric energy, and a heat transfer device by means of which the second electric energy storage and/or the electric drive unit are couplable or coupled to the first electric energy storage for transferring heat, wherein the heat transfer device comprises: a first energy storage working fluid circuit in which the first electric energy storage is arranged; and a second energy storage working fluid circuit in which the second electric energy storage is arranged, the method comprising:

transferring waste heat from the electric drive unit and/or the second electric energy storage to the first electric energy storage.

19. The method of claim 18, wherein:

the transferring of waste heat is ambient condition dependent, power-dependent and/or load-dependent manner.

* * * * *